United States Patent [19]

McGarry

[11] 4,274,852

[45] Jun. 23, 1981

[54] MANUFACTURING GLASS WITH A BUSHING HAVING A DIRECTIONALLY ALIGNED DISPERSION STRENGTHENED TIP PLATE

[75] Inventor: Dennis L. McGarry, Granville, Ohio

[73] Assignee: Owens-Corning Fiberglas Corporation, Toledo, Ohio

[21] Appl. No.: 67,590

[22] Filed: Aug. 17, 1979

[51] Int. Cl.³ .......................... C03B 37/02; B22F 3/20
[52] U.S. Cl. ........................................ 65/2; 65/374 M; 75/172 R; 148/11.5 P; 148/11.5 F
[58] Field of Search .............. 65/1, 374 M; 75/172 E, 75/172 R; 148/11.5 P, 11.5 F

[56] References Cited

U.S. PATENT DOCUMENTS

| | | | |
|---|---|---|---|
| 3,622,310 | 11/1971 | Reinacher et al. | 75/172 X |
| 3,640,705 | 2/1972 | Selman et al. | 75/172 |
| 3,709,667 | 1/1973 | Selman et al. | 29/182.5 |
| 4,002,503 | 1/1977 | Bourne et al. | 148/11.5 P |

OTHER PUBLICATIONS

Selman et al., "Dispersion Strengthened Platinum", Platinum Metals Review #18, (1974), pp. 46–56.

Primary Examiner—Robert L. Lindsay, Jr.
Attorney, Agent, or Firm—Ronald C. Hudgens; Patrick P. Pacella; Robert F. Rywalski

[57] ABSTRACT

An improvement in the manufacture of fibrous glass products is provided by employing a bushing in which the bottom wall, or tip plate, is fabricated of a properly aligned dispersion strengthened precious metal, or alloy thereof.

8 Claims, 2 Drawing Figures

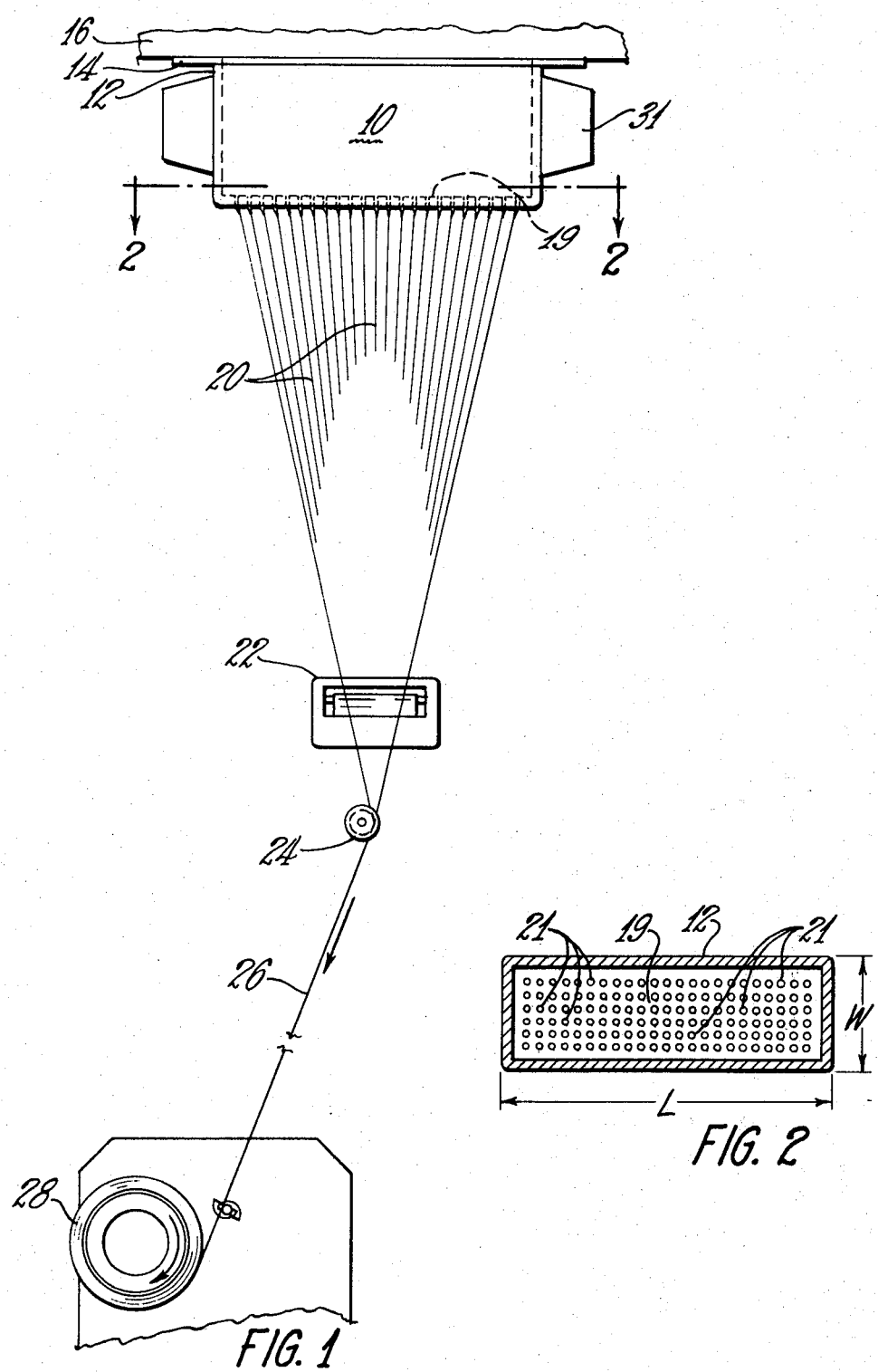

MANUFACTURING GLASS WITH A BUSHING HAVING A DIRECTIONALLY ALIGNED DISPERSION STRENGTHENED TIP PLATE

TECHNICAL FIELD

The present invention relates to the art of glass manufacturing and more particularly it relates to the manufacture of fibrous glass products by the use of a bushing or glass feeder.

BACKGROUND AND SUMMARY

Fibrous glass products have been manufactured for many years using precious metal bushings, or glass feeders. Such glass feeders include a foraminous bottom plate or wall, commonly referred to in the art as a tip plate, which retains a molten pool of glass and which issues a stream of molten glass through the openings thereof. By suitable means the streams of glass are then attenuated and collected in the form of fibers. Such glass feeders, or bushings, must be chemically resistant to the action of molten glass and must be dimensionally stable at high operating temperatures, for example, temperatures in the range of about 1000° C. to 1600° C. Dimensional stability of the foraminous bottom plate or tip plate, particularly in respect to its sag or creep rate, is of particular significance as deformation of the bushing will result in an improper heat distribution across the top plate and can also result in misalignment of the openings of the foraminous bottom wall and enlargement thereof. Obviously, this has a detrimental impact on the quality and cost of glass being manufactured and requires the replacement of the glass feeder. Because precious metals are involved, frequent replacement of the bushing is unsatisfactory because of cost including fabrication and lost production. Consequently, there is a need in the art to provide for a bushing which will have greater dimensional stability and greater resistance to creep at elevated temperatures.

In accordance with the present invention, applicant provides for a glass feeder which has superior high temperatures stress-rupture and creep properties and which is resistant to glass corrosion and oxidation.

Thus, in accordance with one feature of this invention an improvement is provided in methods and apparatus for manufacturing fibrous glass products which methods comprise maintaining a pool of molten glass in a glass feeder having a foraminous bottom plate with a transverse axis shorter than the longitudinal axis thereof, and attenuating a glass stream issuing from said foraminous bottom plate into a glass fiber. The improvement resides in employing a bottom plate which is formed of a dispersion strengthened precious metal, or alloy, with the plate having a lower creep rate along its transverse axis than its longitudinal axis. That is, the bottom plate or tip plate is formed of a creep resistant dispersion strengthened precious metal sheet which is anisotropic with respect to its creep rate and the feeder is so formed that the axis of the tip plate with the minimum creep rate corresponds to the transverse, or width, dimension whereas the axis with the higher creep rate corresponds to the length, or longitudinal axis of the bottom plate.

BRIEF DESCRIPTION OF THE DRAWINGS

In FIG. 1 of the drawings there is schematically shown a typical process for the manufacture of fibrous glass products.

FIG. 2 of the drawings is a view showing the foraminous bottom plate, or tip plate, of a glass feeder taken along line 2—2 of FIG. 1.

DESCRIPTION

Generally FIG. 1 illustrates a glass feeder, or bushing 10, conventionally employed in the art of fibrous glass manufacture. Bushing 10 includes a generally rectilinearly shaped sidewall 12 and disposed at the outer portion thereof is an outwardly extending flange 14 which is adapted to be secured to a supply of molten glass as for example, a forehearth generally designated 16. Typically such bushings are electrically heated and for this purpose any suitable terminals, such as for example, ears 31, are provided which are attached to a suitable source of power (not shown). Bushing 10 likewise includes a foraminous bottom plate 19. While not specifically shown, it will be apparent to those skilled in the art that the openings 21 of bottom plate 19 are usually described as orifices or feeder tips, or simply tips. At any rate the glass issues from the foraminous bottom plate as streams of molten glass. These streams are then attenuated into fibers 20 which in turn are passed through a suitable size applicator 22 and then converge to a suitable gathering means 24, in the form of a strand 26, which is then collected on a suitable puller, roll up drum or winder 28. As indicated above, the bushing may be appended to a forehearth to receive and maintain a supply of molten glass therein or, as will be apparent the bushing may be employed for marble melting purposes.

As will be readily appreciated by those skilled in the art, while tube tips are not shown on the bushing 10, it will be preferred to employ such tips. Additionally, and again while not shown, it will be preferred that appurtenant to the bushing, and more specifically the tips, in a manner well know in the art, will be fins, or fin-shields, which extend from a cooled manifold. These fins, or shield members, are typically disposed in an aligned, side by side relationship relative to rows of tips in bottom plate 19 and greatly enhance glass filament production.

Dispersion strengthened precious metal sheets or plates contemplated for use in the present invention are known in the art and, in fact, are commercially available. One such material, preferred for use as contemplated herein, is that available from Johnson, Matthey & Co. Limited, under their designation ZGS. The dispersion strengthened precious metal sheet, or plate, materials contemplated for use herein generally consist essentially of a precious metal, or precious metal alloy, preferably platinum, as the dispersing medium, or matrix, and a dispersoid of a metal oxide, metal carbide, metal silicide, metal nitride, metal sulfide or a metal boride which dispersoid is present in effective dispersion strengthening amounts. Usually such amounts will be between about 0.1 percent to about 5 percent (by volume). Preferably the dispersoid will be an oxide. Exemplary of metal compounds which may be employed as the dispersoid are compounds of metals of Group IIA, IIIA, IIIB (including non-hazardous metals of the Actinide and Lanthanide classes), IVB, VB, VIB and VIIB. More specifically exemplary of suitable metals are the following: Be, Mg, Ca, Ba, Y, La, Ti, Zr, Hf, Mo, W, Ce, Nd, Gd, and Th as well as Al. The above indicated ZGS sheet, or plate, material consists essentially of platinum in which the dispersoid is zirconia; the latter is present in an amount of about 0.5% by volume. Suitable thicknesses for the bottom plate of the bushing may vary with different bushing sized but generally it may be stated that the plate will have a thickness ranging from about 0.010 to about 0.080 inches.

Methods for manufacturing suitable bottom plates of the dispersion strengthened precious metal, or alloys of a precious metal, are well known in the art and include not only wet chemistry techniques but more conventional powder metallurgy techniques. One such way for manufacturing the dispersion strengthened precious metal alloy is by a process referred to in the art as internal oxidation. In accordance with this technique a precious metal or a precious metal alloy is alloyed with one of the above type indicated metals and then processed into the form of powders, as for example by spraying with an oxy-acetylene spray gun. Dry powders may then be milled to produce flakes, which flakes are then in turn treated with an appropriate gas, preferably air or oxygen, to convert the metal into one of the above type dispersoids. Such flakes may then be consolidated by a pressing operation and then sintered. The sintered compact is then thermo-mechanically processed, which process includes a rolling operation, into a suitable sized sheet or plate. In this respect further details may be had by reference to U.S. Pat. Nos. 3,708,667 and 3,622,310.

These sheet or plate materials of dispersion strengthened precious metal may be fabricated into a glass feeder by conventional techniques. For example, the foraminous bottom plate is formed by drilling or punching holes therein to form the foraminous structure. Tubular members, or tips, are then inserted into the openings provided in the tip plate and then welded to the plate as with an electron beam. The bottom plate is then welded to the sidewalls 12 so as to form a unitary, single piece bushing. In passing it should be mentioned that while sidewalls 12 may also be formed of dispersion strengthened precious metals, or precious metal alloys, such sidewalls can simply be a precious metal or precious metal alloy, for example an alloy of platinum and rhodium which has not been dispersion strengthened. The same applies for the tube tips.

Applicant has found that in order to obtain unexpectedly superior improvement in bushing operating life, the bushing should be fabricated such that the foraminous bottom plate has a prescribed directional alignment. Along these lines, applicant has found that such sheets or plates of dispersion strengthened precious metal, or dispersioned strengthened precious metal alloys are anisotropic with respect to creep rate. That is, applicant has found that such sheets will have a significantly lower creep rate (higher creep resistance) in one direction than a direction perpendicular thereto. In those instances where the sheet or plate materials for use in a glass feeder are manufactured by a process which includes rolling, the lower creep rate corresponds to the dominant rolling direction.

Referring now to FIG. 2 it will be seen that the foraminous bottom plate typically has a width, or transverse, axis (W) which is less than its length, or longitudinal, axis (L). Commonly the ratio of W to L will be less than about 0.5. Thus in order to obtain the improved results the bushing should be fabricated such that the axis of the sheet material employed having the minimum creep rate should be parallel to the transverse axis (W) of bottom plate 19. Alternatively stated, the sheet employed to fabricate the bushing will be so directionally positioned such that the axis of the sheet having the lower creep resistance will be parallel and correspond to the longitudinal axis (L) of bottom plate 19. In using sheets of dispersion strengthened metals which have been formed by a process which includes rolling, the bushing will be so formed such that the rolling direction of the sheet, and consequently the direction in which the grains are elongated, will be parallel to the transverse axis, or width (W) of bottom plate 19. Outstanding sag-resistance will be obtained when the foraminous bottom plate 19 is so formed that the creep rate, along the width or tranverse axis thereof, is less than about $5 \times 10^{-5}$ inch per inch per hour (at 2,800° F. and a stress of 800 p.s.i.), especially when the creep rate along the length direction is less than one-half that value. As previously indicated a suitable preferred material for use herein is a sheet material commercially available from Johnson, Matthey & Company Limited under their designation ZGS; such a material, for desirable results, will have a stress rupture life of at least 48 hours when tested at 1400° C. and 1000 p.s.i. in the rolling direction of the sheet.

In passing it should be mentioned that the description above equally applies to what is commonly referred to in the art as a "double bottom bushing". Such a bushing is formed of a bottom plate which includes two abuting plates which have been welded together, along the length direction, to produce a unitary (double) bottom wall 19. In operation, the bushing is typically supported adjacent the forehearth, along it length direction and its double bottom is generally supported along the weld lines by a suitable rod or other support member which runs parallel to the length direction of the bushing. When fabricating such bushings as contemplated herein, the rolling direction of the sheet material employed will still be such that it will be parallel to the minimum dimension, i.e., the width or transverse axis of the double bottom bushing as this is the direction of maximum stress.

I claim:

1. In a fibrous glass manufacturing process comprising maintaining a pool of molten glass in a glass feeder having a foraminous bottom plate with a transverse axis shorter than a longitudinal axis thereof, and attenuating a glass stream issuing from said foraminous bottom plate into a glass fiber, said plate being formed of a dispersion strengthened precious metal, or alloy thereof, the improvement wherein said dispersion strengthened plate has a smaller creep rate along its transverse axis than its longitudinal axis.

2. The improvement of claim 1 wherein said plate is formed by a process which includes rolling, the rolling direction of said plate being parallel to said transverse axis.

3. The improvement of claim 2 wherein said plate consists essentially of platinum, or a platinum-rhodium alloy, as the dispersing medium and an effective dispersion strengthening amount of a metal oxide or carbide or boride or silicide or nitride or sulfide as the dispersoid.

4. In a fibrous glass manufacturing apparatus comprising glass feeding means for maintaining a pool of molten glass and for issuing a stream of glass therefrom, said means including a dispersion strengthened foraminous bottom plate, of platinum or a platinum-rhodium alloy, with a transverse axis shorter than a longitudinal axis thereof, and means for attenuating said glass stream into a glass fiber, the improvement wherein said bottom plate is anisotropic with respect to its creep rate, the axis with the smaller creep rate corresponding to the transverse axis of the bottom plate of said feeding means and the axis with the larger creep rate corresponding to longitudinal axis of said bottom plate.

5. The improvement of claim 1 wherein said plate has a stress rupture life, along its transverse axis, of at least 48 hours (at 1400° C. and 1000 psi).

6. The improvement of claim 1 wherein the creep rate of said plate along its transverse axis is less than about $5 \times 10^{-5}$ inch per inch per hour (at 2,800° F. and a stress of 800 p.s.i.)

7. The improvement of claim 4 wherein said dispersoid is zirconia.

8. The improvement of claim 6 wherein the ratio of the creep rate along the transverse axis to that along the longitudinal axis is greater than about 2.

* * * * *

UNITED STATES PATENT AND TRADEMARK OFFICE
CERTIFICATE OF CORRECTION

PATENT NO. : 4,274,852

DATED : June 23, 1981

INVENTOR(S) : Dennis L. McGarry

It is certified that error appears in the above—identified patent and that said Letters Patent is hereby corrected as shown below:

At column 1, line 31, the word "top" should be changed to "tip".

At column 1, line 44, the word "temperatures" should be changed to "temperature".

At column 3, line 6, the word "sized" should be changed to "sizes".

At column 3, line 29, the patent number "3,708,667" should be changed to "3,709,667".

At column 6, line 6, the words "claim 4" should be changed to "claim 3".

At column 6, line 7, the words "claim 6" should be changed to "claim 4".

Signed and Sealed this

Thirteenth Day of October 1981

[SEAL]

Attest:

GERALD J. MOSSINGHOFF

Attesting Officer

Commissioner of Patents and Trademarks